(12) United States Patent
Lu

(10) Patent No.: US 7,841,465 B2
(45) Date of Patent: Nov. 30, 2010

(54) OPTICAL DISK STORAGE BOX

(76) Inventor: Andong Lu, Room 419, No. 1357, West Beijing Road, Shanghai (CN) 200040

( * ) Notice: Subject to any disclaimer, the term of this patent is extended or adjusted under 35 U.S.C. 154(b) by 0 days.

(21) Appl. No.: 12/351,847

(22) Filed: Jan. 11, 2009

(65) Prior Publication Data

US 2010/0170815 A1   Jul. 8, 2010

(30) Foreign Application Priority Data

Jan. 6, 2009  (CN) .................. 2009 1 0044938

(51) Int. Cl.
*B65D 85/57* (2006.01)
(52) U.S. Cl. .................. 206/308.1; 206/232
(58) Field of Classification Search .................. 206/1.5, 206/232, 308.1–308.3, 309, 311–313; 70/57.1
See application file for complete search history.

(56) References Cited

U.S. PATENT DOCUMENTS

| | | | | |
|---|---|---|---|---|
| 4,708,239 A | * | 11/1987 | Bourbon | 206/308.3 |
| 5,425,448 A | * | 6/1995 | O'Brien et al. | 206/232 |
| 5,462,158 A | * | 10/1995 | Kramer | 206/308.1 |
| 5,495,940 A | * | 3/1996 | Taniyama | 206/308.1 |
| 5,645,165 A | * | 7/1997 | Taniyama | 206/308.1 |
| 5,799,782 A | * | 9/1998 | Gelardi | 206/308.1 |
| 5,839,575 A | * | 11/1998 | Blanco | 206/232 |
| 6,478,150 B1 | * | 11/2002 | Solling | 206/308.1 |
| 7,028,836 B2 | * | 4/2006 | Hsiao et al. | 206/308.2 |
| 7,124,422 B2 | * | 10/2006 | Yamagishi et al. | 206/308.1 |

* cited by examiner

*Primary Examiner*—Bryon P Gehman

(57) ABSTRACT

An optical disk storage box includes a storage body, a cover and a connecting arrangement that movably connects the storage body with the cover. The storage body includes a bottom board, a storage wall unit perpendicularly provided on the bottom board and defining a storage cavity. The storage wall unit includes a first storage wall, a second storage wall, a third storage wall and a fourth storage wall. The storage body further includes two blocking flakes inwardly and transversely extended from two ends of an upper edge of the third storage wall respectively, and at least a fastening member upwardly extended from the bottom board and having a predetermined distance from the first storage wall inside the storage cavity. The fastening member includes a longitudinal arm upwardly extended from the bottom board, and a transverse arm inwardly and transversely extended from an upper end of the longitudinal arm.

20 Claims, 7 Drawing Sheets

OPTICAL DISK STORAGE BOX

BACKGROUND OF THE PRESENT INVENTION

1. Field of Invention

The present invention relates to an optical disk storage box, and more particularly to an optical disk storage box that has a storage cavity for storing at least one optical disk with an external packing, and is capable of avoiding frictions among optical disks that will cause scratches during the transportion and the storing process.

2. Description of Related Arts

Nowadays, optical disks are stored mainly in a storage box (usually in form of CD or DVD box). A conventional optical disk storage box comprises a cover and a casing movably connected with the cover. The casing has an accommodating space for receiving the optical disk, and comprises a locker (conventionally called "hub") provided at a center thereof for fastening the optical disk, in such a manner that an aperture at a center of the optical disk is engaged with the hub to fasten the optical disk within the accommodating space. It is worth to mention that the above optical disk storage box can be made up of a casing, and two covers movably connected with the casing at a side and an opposite side thereof respectively.

However, the above mentioned optical disk storage box has several drawbacks. Firstly, a peripheral edge of the aperture of the optical disk is easily worn so that a diameter of the aperture is enlarged by putting in or out the optical disk time after time. Accordingly, the hub is easily worn so that the hub will be insufficiently engaged with the optical disk after long-term use. As a result, the optical disk easily falls off from the accommodating space thus causing scratch or even damage.

Secondly, it is hard for the hub to hold new or old optical disks. On the one hand, if the hub holds the optical disk too tightly, it is hard to take it down so that the optical disk and the hub are easily damaged. On the other hand, if the hub is engaged insufficiently with the optical disk, the optical disk will easily fall off from the accommodating space to be damaged, especially when the storage box is shaken or transported.

Lastly, the conventional optical disk storage box is capable of storing at most a pair of optical disks. Nowadays, many optical disks are sold together. If the conventional optical disk storage box is designed to store more than two optical disks, high cost and complicated structure will be needed. Furthermore, a storage bag is used to store a plurality of optical disks. However, the storage bag is not capable of effectively preventing the accidental impact during the transportation and storing process.

SUMMARY OF THE PRESENT INVENTION

An object of the present invention is to provide an optical disk storage box, having a storage cavity for storing at least one optical disk with an external packing, which is capable of avoiding frictions among optical disks that will cause scratches during the transportion and the storing process.

Another object of the present invention is to provide an optical disk storage box comprising at lease one fastening member provided within the storage cavity for stably holding the optical disks within the storage cavity without accidental damage even if the optical disk storage box is shaken or transported.

Another object of the present invention is to provide an optical disk storage box for conveniently selling a set of optical disks, such as a set of music CDs, a set of DVD film series. That is to say, without increasing cost and changing original structure, the optical disk storage boxes with different storage capacity are produced as required.

Another object of the present invention is to provide an optical disk storage box, which has a shape similar to a book at its closed position to conveniently be stored, collected and displayed on the shelves of individuals, libraries or stores.

Another object of the present invention is to provide an optical disk storage box with low cost and simple structure.

Accordingly, in order to accomplish the above object, the present invention provides an optical disk storage box for storing at least an optical disk with an external packing, comprising:

a storage body comprising:

a bottom board;

a storage wall unit perpendicularly provided on the bottom board and defining a storage cavity for storing the optical disk with the external packing, wherein the storage wall unit comprises a first storage wall, a second storage wall, a third storage wall opposite to the first storage wall, and a fourth storage wall opposite to the second storage wall;

at least a fastening member, upwardly extended from the bottom board and having a predetermined distance from the first storage wall inside the storage cavity, wherein the fastening member comprises a longitudinal arm upwardly extended from the bottom board and a transverse arm inwardly and transversely extended from an upper end of the longitudinal arm; and a pair of blocking projections inwardly and transversely extended from two ends of an upper edge of the third storage wall respectively, each of which defines an extending distance so as to lock up the optical disk with the external packing within the storage cavity;

a cover, fittedly and shapedly engaged with the storage body, comprising:

a cover board, having a cover connecting side; and three cover walls, perpendicularly extended from three edges of the cover board respectively; and a connecting arrangement movably connected the storage body with the cover, wherein the connecting arrangement connects with the cover at the cover connecting side, and the connecting arrangement connects with the storage body at a side at which the second storage wall is provided.

These and other objectives, features, and advantages of the present invention will become apparent from the following detailed description, the accompanying drawings, and the appended claims.

DETAILED DESCRIPTION OF THE PREFERRED EMBODIMENT

Figure 1:
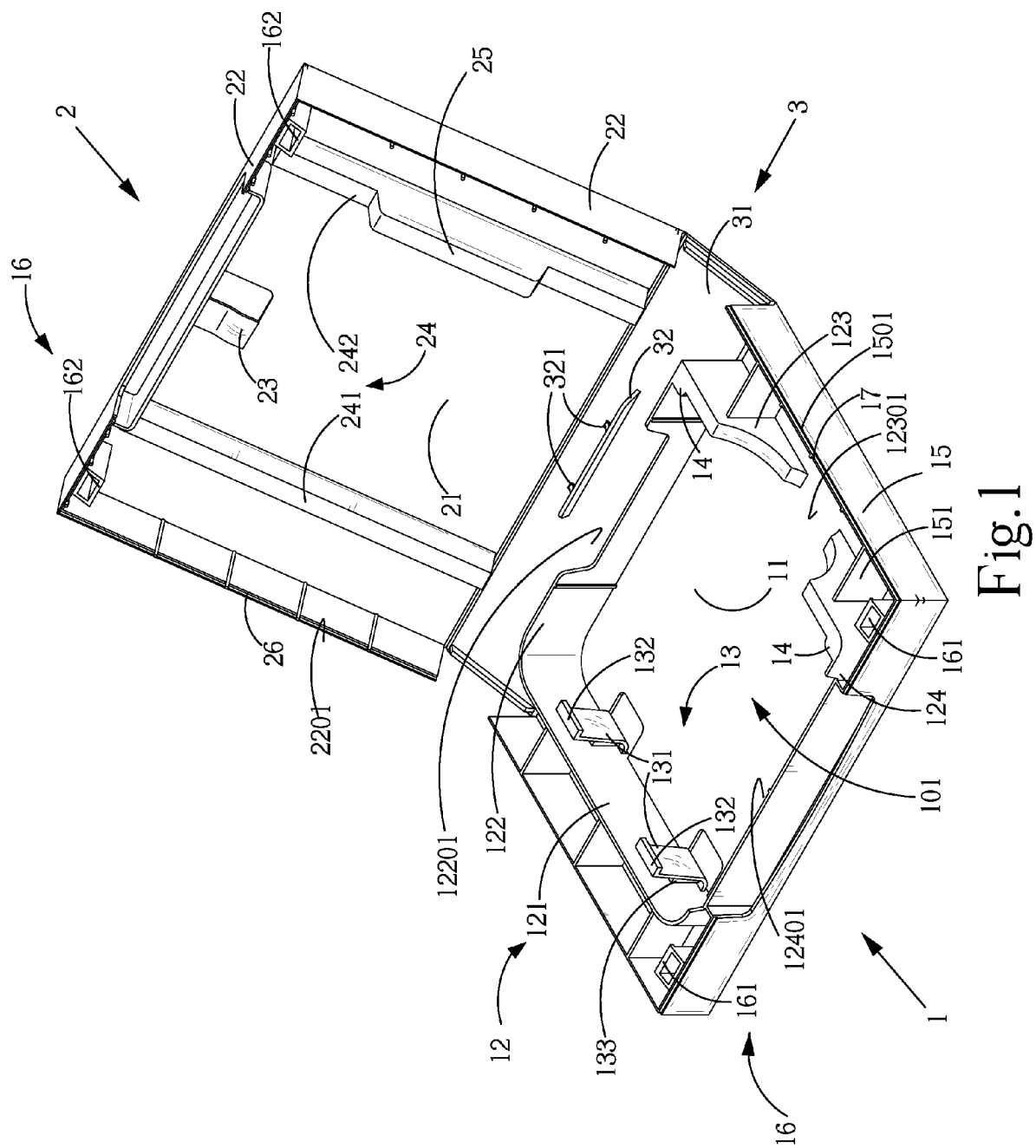
FIG. 1 is a perspective view of an optical disk storage box according to a preferred embodiment of the present invention.
Figure 2A:
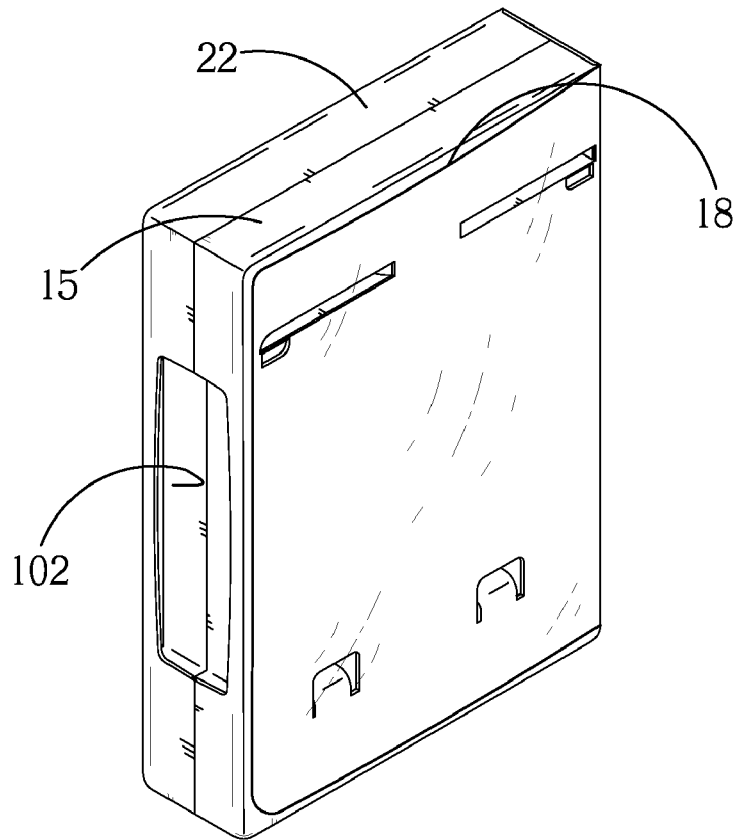
FIG. 2A is a perspective view of the optical disk storage box according to the above preferred embodiment of the present invention while the optical disk storage box is closed.
Figure 2B:
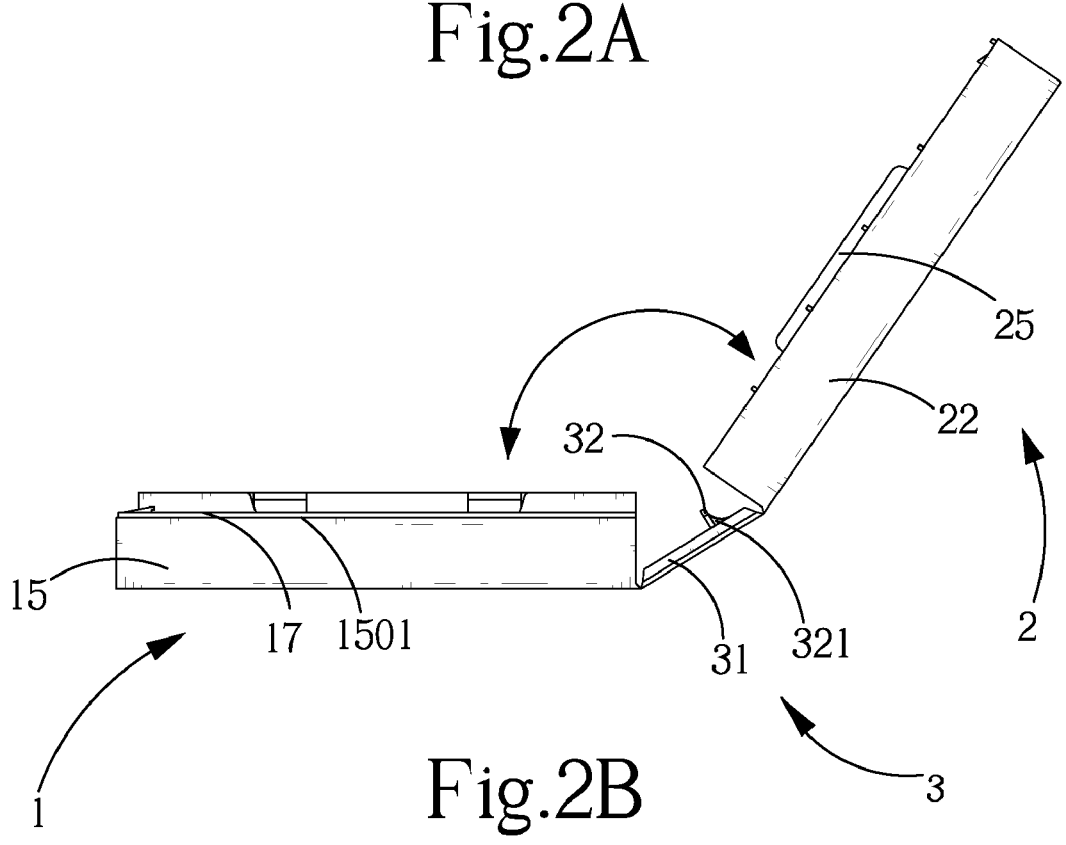
FIG. 2B is a side view of the optical disk storage box according to the above preferred embodiment of the present invention while the optical disk storage box is open.
Figure 3:
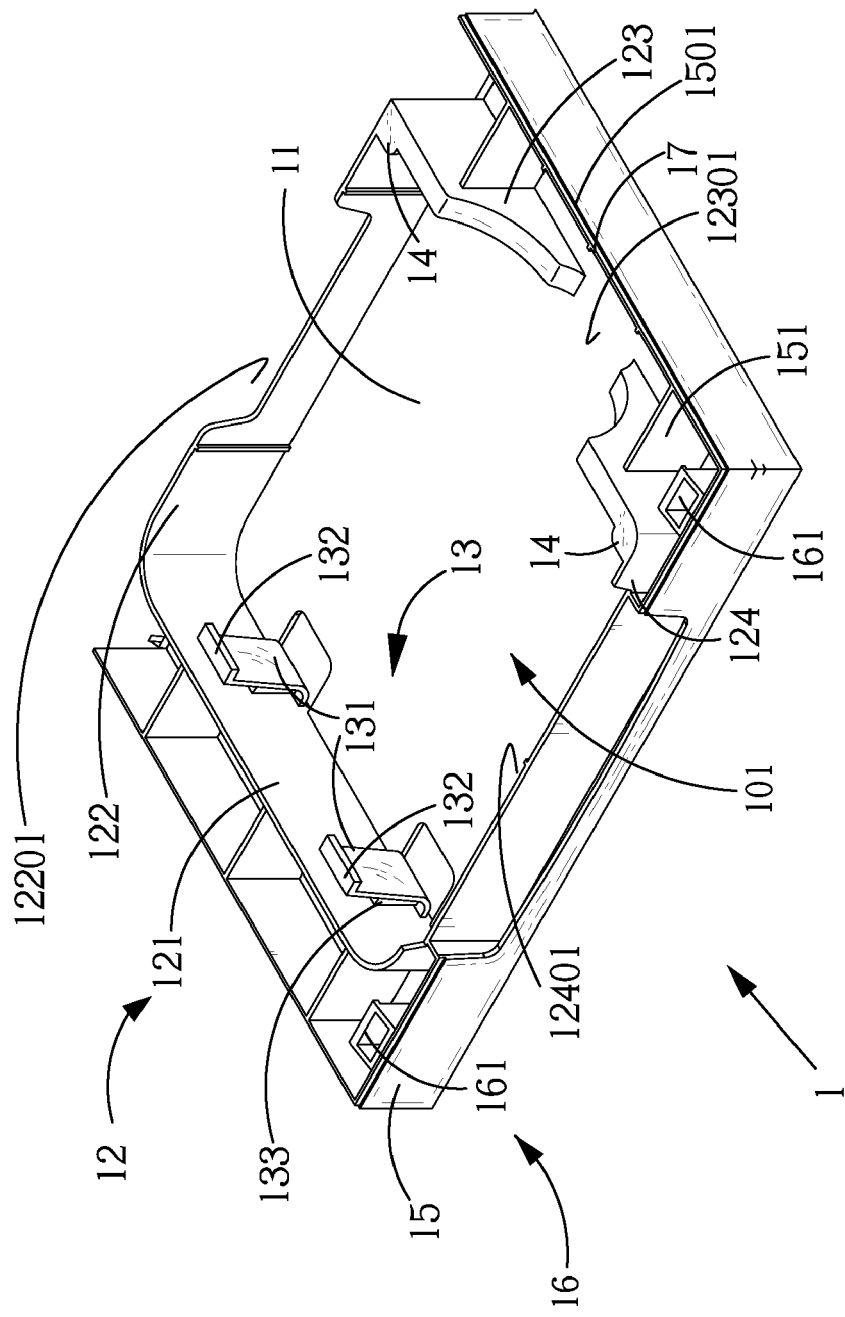
FIG. 3 is a perspective view of a storage body of the optical disk storage box according to the above preferred embodiment of the present invention.
Figure 4:
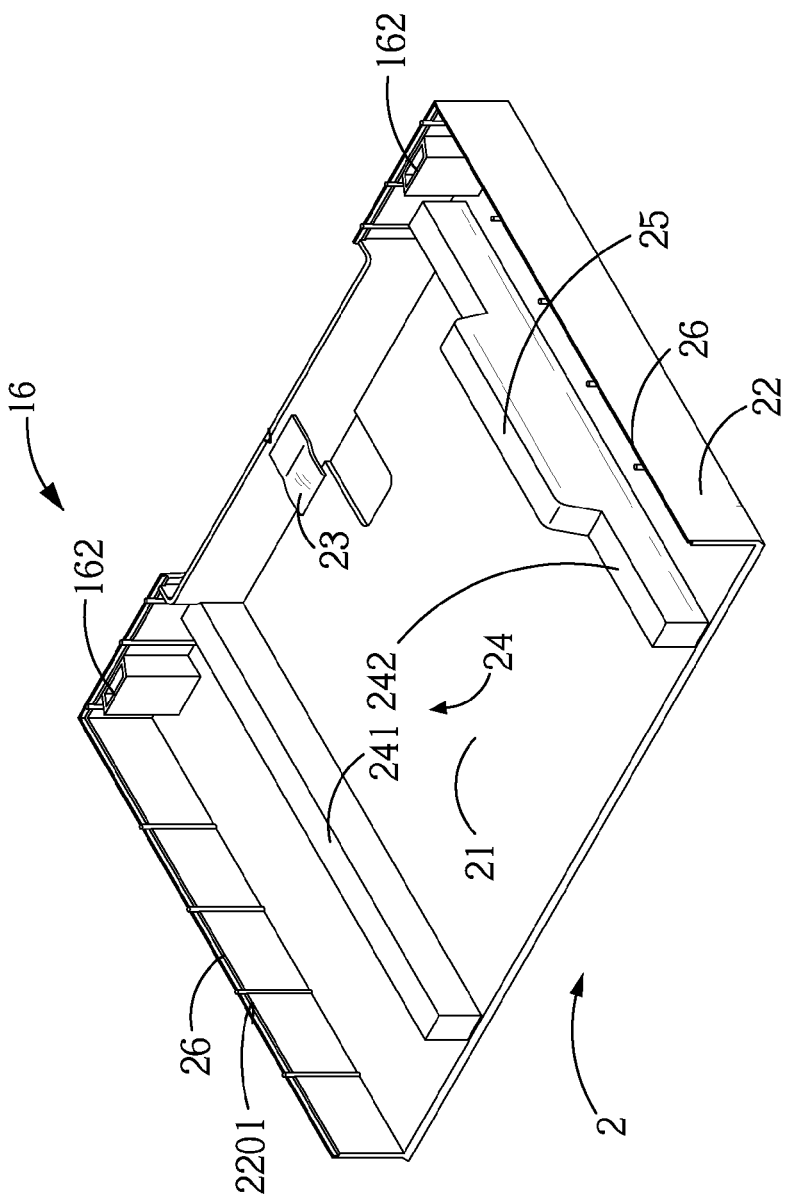
FIG. 4 is a perspective view of a cover of the optical disk storage box according to the above preferred embodiment of the present invention.

Referring to FIGS. 1, 2A, 2B, 3 and 4 of the drawings, an optical disk storage box according to a preferred embodiment of the present invention is illustrated, which is adapted for storing at least one optical disk with an external packing, wherein the optical disk comprises a storage body 1, a cover 2 fittedly and shapedly engaged with the storage body 1, and a connecting arrangement 3 which movably connects the storage body 1 with the cover 2.

The storage body 1 comprises a bottom board 11, a storage wall unit 12 perpendicularly provided at the bottom board 11, defining a storage cavity 101 for storing at least one optical disk with the external packing, wherein the storage wall unit 12 comprises a first storage wall 121, a second storage wall 122, a third storage wall 123 opposite to the first storage wall 121, and a fourth storage wall 124 opposite to the second storage wall 122. Furthermore, a height of the storage wall unit 12 is determined by the number of the optical disk with the external packing provided within the storage cavity 101 as required.

When the external packing of the optical disk is cuboid, the storage wall unit 12 has a rectangle-shaped correspondingly, that is to say, the first storage wall 121 is perpendicular to the second storage wall 122, the second storage wall 122 is perpendicular to the third storage wall 123, and the third storage wall 123 is perpendicular to the fourth storage wall 124.

The storage body 1 further comprises at least one fastening member 13 upwardly extended from the bottom board 11 and having a predetermined distance from the first storage wall 121 inside the storage cavity 101, wherein the fastening member 13 comprises a longitudinal arm 131 upwardly extended from the bottom board 11 and a transverse arm 132 inwardly and transversely extended from an upper end of the longitudinal arm 131, wherein a distance between the transverse arm 132 and the bottom board 11 is equal to the height of the storage wall unit 12.

It is worth to mention that while the optical disk with the external packing is put in or out, a force is applied to the fastening member 13 so that the fastening member 13 is driven to move close to the first storage wall 121 to accommodate the optical disk with the external packing within the storage cavity 101. According to the preferred embodiment, the storage body 1 comprises more than one fastening members 13.

According to the preferred embodiment, the fastening member 13, having a predetermined width to effectively fasten the optical disk with the external packing within the storage cavity 101, further comprises a first reinforcing rib 133 provided between the first storage wall 121 and the longitudinal arm 131, and close to a lower portion thereof so as to not only strengthen an intensity of the fastening member 13, but also effectively retain a distance between the longitudinal arm 131 and the first storage wall 121.

Preferably, the fastening member 13 is made of materials having a predetermined rigidity, such as plastic, so that the fastening member 13 is capable of being driven to move towards the first storage wall 121 while applying a force and returning without applying the force.

The storage body 1 further comprises two blocking projections 14 inwardly and transversely extended from an end of an upper edge of the third storage wall 123, and an opposite end of an upper edge of the third storage wall 123 respectively, each of which defines a extending distance, so as to lock up the optical disk with the external packing within the storage cavity 101, wherein the extending distance is smaller than a distance between the fastening member 13 and the first storage wall 121 to conveniently put in or out the optical disk with the external packing. As a result, when the optical disk with the external packing is stored within the storage cavity 101, a peripheral edge of the optical disk with the external packing is enclosed by the longitudinal arm 131, the second storage wall 122, the third storage wall 123 and the fourth storage wall 124, and a top surface of the optical disk with the external packing is held by the transverse arm 132 and the two blocking projections 14 so as to stably hold the optical disk with the external packing within the storage cavity 101 to avoid frictions among optical disks that will cause scratches during the transport and the storing process.

The second storage wall 122 has a first concaved opening 12201. Accordingly, the connecting arrangement 3 comprises a connecting board 31 which connects the storage body 1 with the cover 2, and a blocking bar 32 perpendicularly extended from the connecting board 31 to fit into the first concaved opening 12201, wherein a distance between the blocking bar 32 and an edge of the connecting board 31 connecting with the storage body 1 is equal to the height of the storage wall unit 12, in such a manner that while a user closes the optical disk storage box, the blocking bar 32 effectively holds the optical disk with the external packing within the storage cavity 101. According to the preferred embodiment, the blocking bar 32 comprises at least one second reinforcing rib 321 provided at a lower portion thereof to strengthen the intensity of the blocking bar 32.

The third storage wall 123 has a third concaved opening 12301, a height of which is equal to a height of the third storage wall 123 so that the fastening member 13 moves close to the first storage wall 121 while a user pushes the optical disk with the external packing through the third concaved opening 12301 to conveniently take out of the optical disk with the external packing.

According to the preferred embodiment of the present invention, the storage body 1 further comprises three reinforcing walls 15, provided at a peripheral edge of the bottom board 11, perpendicularly extended from the bottom board 11 and corresponding to the first storage wall 121, the third storage wall 123 and the fourth storage wall 124 respectively for encircling the storage wall unit 12, so as to slow down impacts or excursions on the storage body 1 to prevent the optical disk within the storage cavity 101 from being destroyed. Moreover, the storage body 1 comprises a plurality of the third reinforcing ribs 151 provided between each of the reinforcing walls 15 and the storage wall unit 12 for strengthening the intensity of the storage body 1 to slow down impacts or accidentally excursions on the storage body 1 to prevent the optical disk within the storage cavity 101 from being destroyed.

The cover 2 comprises a cover board 21, having a cover connecting side, and three cover walls 22 perpendicularly extended from three edges of the cover board 21 respectively, wherein the connecting arrangement 3 connects with the cover 2 at the cover connecting side, wherein the connecting arrangement 3 connects with the storage body 1 at a side thereof at which the second storage wall 122 is provided. The three cover walls 22 fit into the three reinforcing walls 15 to close the optical disk storage box. It is worth to mention that the optical disk storage box is similar to a book in shape for showing and collecting like the book while the optical disk storage box is closed.

The fourth storage wall 124 has a second concaved opening 12401. Accordingly, the cover 2 comprises a blocking arm 23 perpendicularly extended from one of the cover walls 22 corresponding to the fourth storage wall 124, wherein while the optical disk storage box is closed, a distance between the blocking arm 23 and the bottom board 11 is slightly lower than the height of the storage wall unit 12 to stably fasten the optical disk with the external packing within the storage cavity 101.

The cover 2 further comprises a pressing bar set 24, perpendicularly extended from the cover board 21, which comprises a first pressing bar 241 and a second pressing bar 242 fitted into the first storage wall 121 and the third storage wall 123 respectively, in such a manner that when the optical disk storage box is closed, the first pressing bar 241 and the second pressing bar 242 contact with a top surface of the first storage wall 121 and the third storage wall 123 respectively to define a closed space so as to fasten the optical disk within the closed space even if the optical disk is out of the storage cavity 101 accidentally. Furthermore, the closed space is capable of slowing down impacts or excursions on the cover 2 to prevent the optical disk within the storage cavity 101 from being destroyed.

The cover 2 further comprises a filling bulger 25, perpendicularly extended from the second pressing bar 242, which is fittedly and shapedly engaged with the third concaved opening 12301 to stably fasten the optical disk with the external packing within the storage cavity 101 while the optical disk storage box is closed.

The optical disk storage box further comprises a locking arrangement 16 to lock up the cover 2 and the storage body 1 at a closed position, wherein the locking arrangement 16 comprises at least a lower locker 161 provided at the reinforcing walls 15, and at least an upper locker 162 provided at the cover walls 2, fittedly and shapedly engaged with the lower locker 161. When the lower locker 161 and the upper locker 162 are engaged with each other, the optical disk storage box is lock up at the closed position. According to the preferred embodiment of the present invention, the locking arrangement 16 comprises a pair of lower lockers 161 and a pair of upper lockers 162. It is worth to mention that the locking arrangement 16 can be made of magnet such that the lower locker 161 attracts the upper locker 162 to lock up the optical disk storage box at the closed position.

According to the preferred embodiment of the present invention, the optical disk storage box further has a groove 102 provided at a side wall thereof to conveniently open the optical disk storage box.

The storage body 1 has a lower slot rim 1501 provided along an exterior peripheral edge of the reinforcing walls 15, defining a lower engaging portion 17, so that a height of the exterior peripheral edge of the reinforcing walls 15 is smaller than that of an interior peripheral edge of the reinforcing walls 15. Accordingly, the cover 2 has an upper slot rim 2201 provided along an interior peripheral edge of the cover walls 22 and fitted into the lower slot rim 1501, defining an upper engaging portion 26, so that a height of the interior peripheral edge of the cover walls 22 is smaller than that of the exterior peripheral edge of the cover walls 22. As a result, the upper engaging portion 26 is engaged with the lower slot rim 1501, and the lower engaging portion 17 is engaged with the upper slot rim 2201 for preventing the dirty from entering the storage box to keep the optical disk clean.

Similarly, a height of the exterior peripheral edge of the reinforcing walls 15 is higher than that of an interior peripheral edge of the reinforcing walls 15. Accordingly, a height of the interior peripheral edge of the cover walls 22 is higher than that of the exterior peripheral edge of the cover walls 22.

According to the preferred embodiment of the present invention, the optical disk storage box further comprises a film member 18 detachably attached to an exterior surface of the bottom board 11, the cover board 21 and the connecting board 31 to prevent from the dirty and beautify. Furthermore, when the film member 18 is transparent, a piece of paper is capable of inserting between the film member 18 and the exterior surface of the bottom board 11, the cover board 21 and the connecting board 31 to have a label.

Figure 5A:
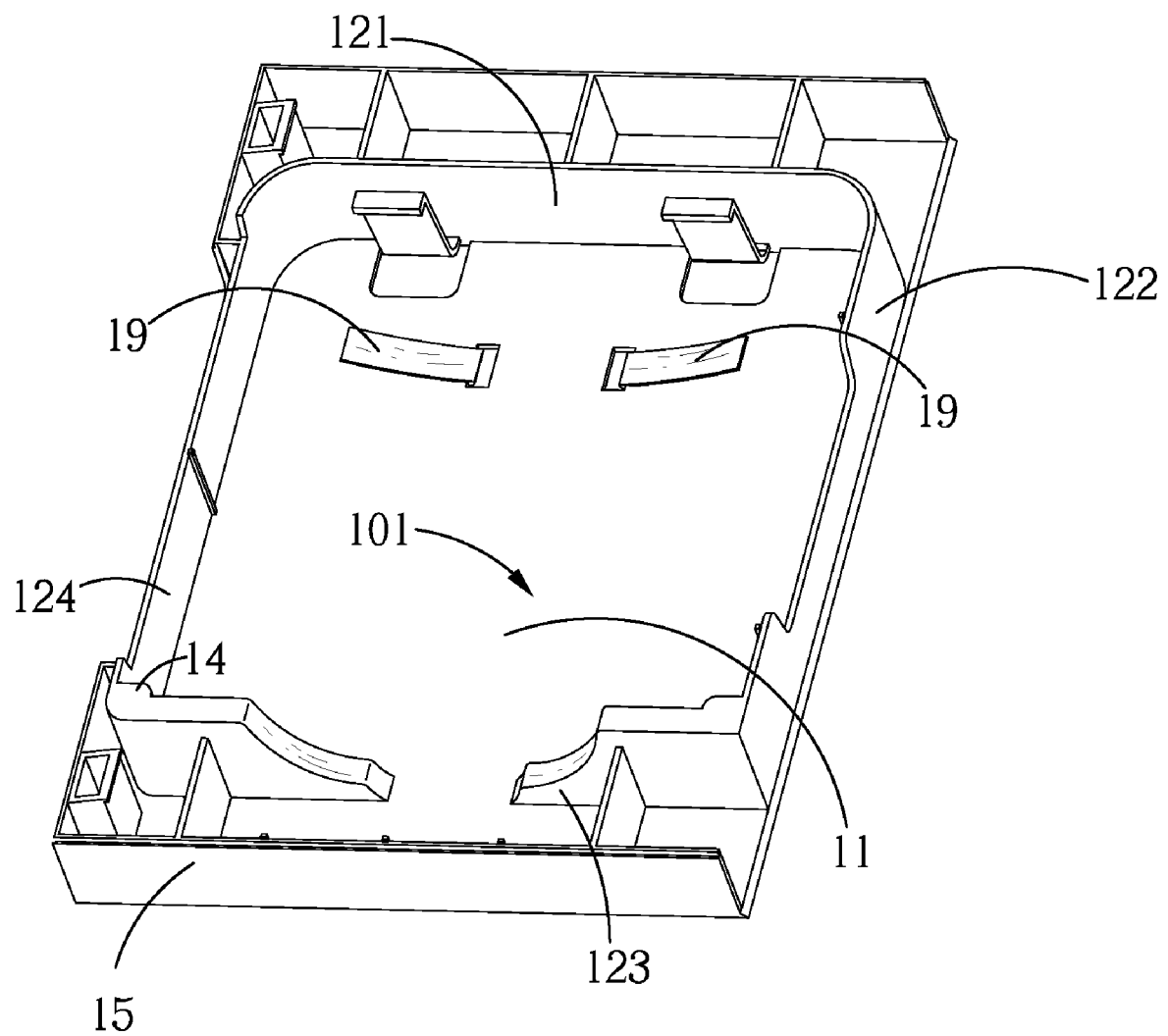
FIG. 5A is a perspective view of a first alternative mode of the storage body of the optical disk storage box according to the above preferred embodiment of the present invention.
Figure 5B:
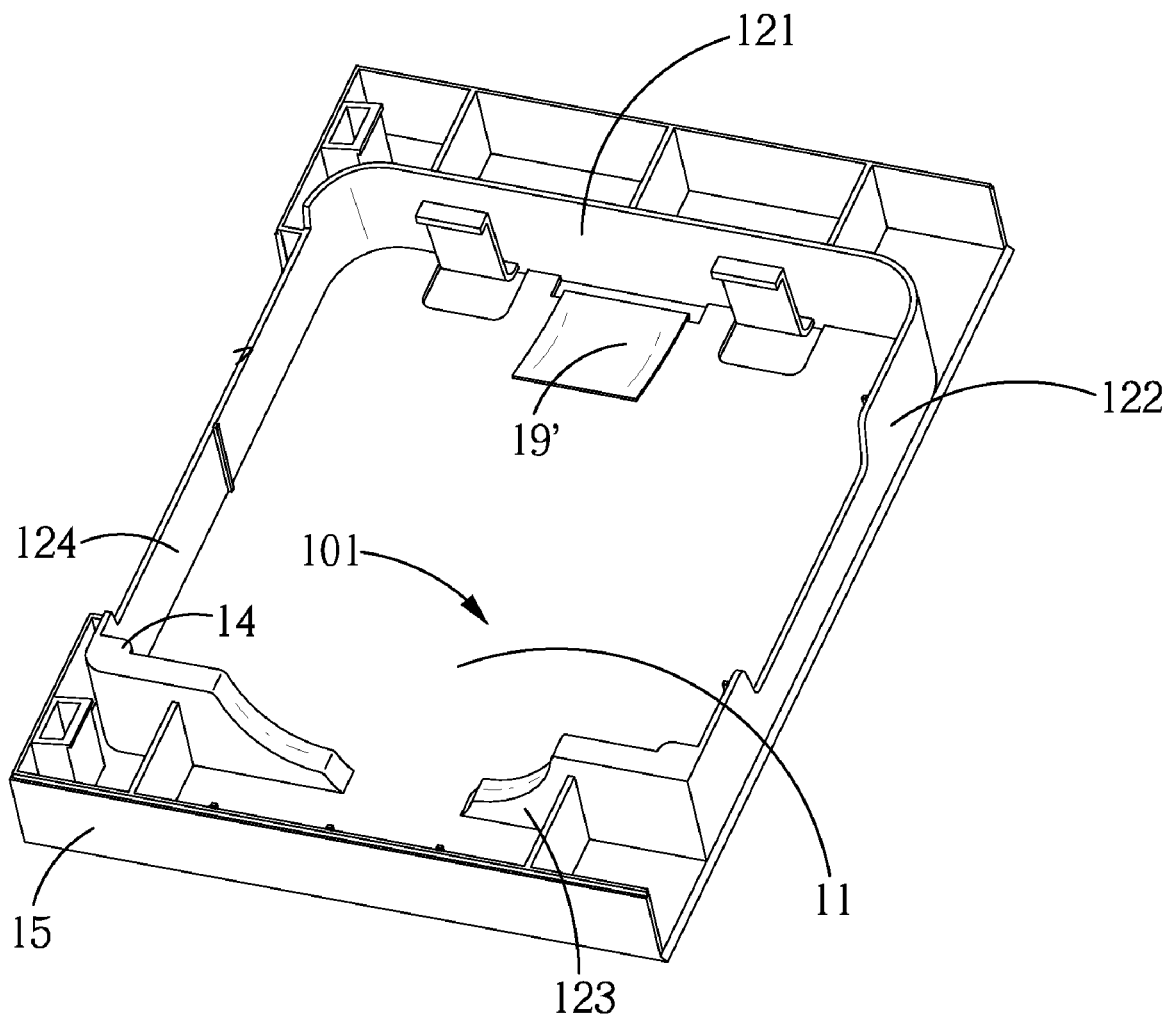
FIG. 5B is a perspective view of a second alternative mode of the storage body of the optical disk storage box according to the above preferred embodiment of the present invention.

As shown in FIGS. 5A and 5B, the storage body 1 further comprises an elastic member 19 provided on the bottom board 11 within the storage cavity 101 so as to produce an upward force to support the optical disk with the external packing such that while a user pushes the optical disk with the external packing, the fastening member 13 is close easily to the first storage wall 121 to conveniently take out of the optical disk, wherein the elastic member 19 is a spring piece. As an alternative mode, the elastic member 19' is extended from a bottom of the first storage wall 121. It is worth to mention that the elastic member 19 and the storage body 1 are capable of forming as a whole during manufacture process.

Figure 6:
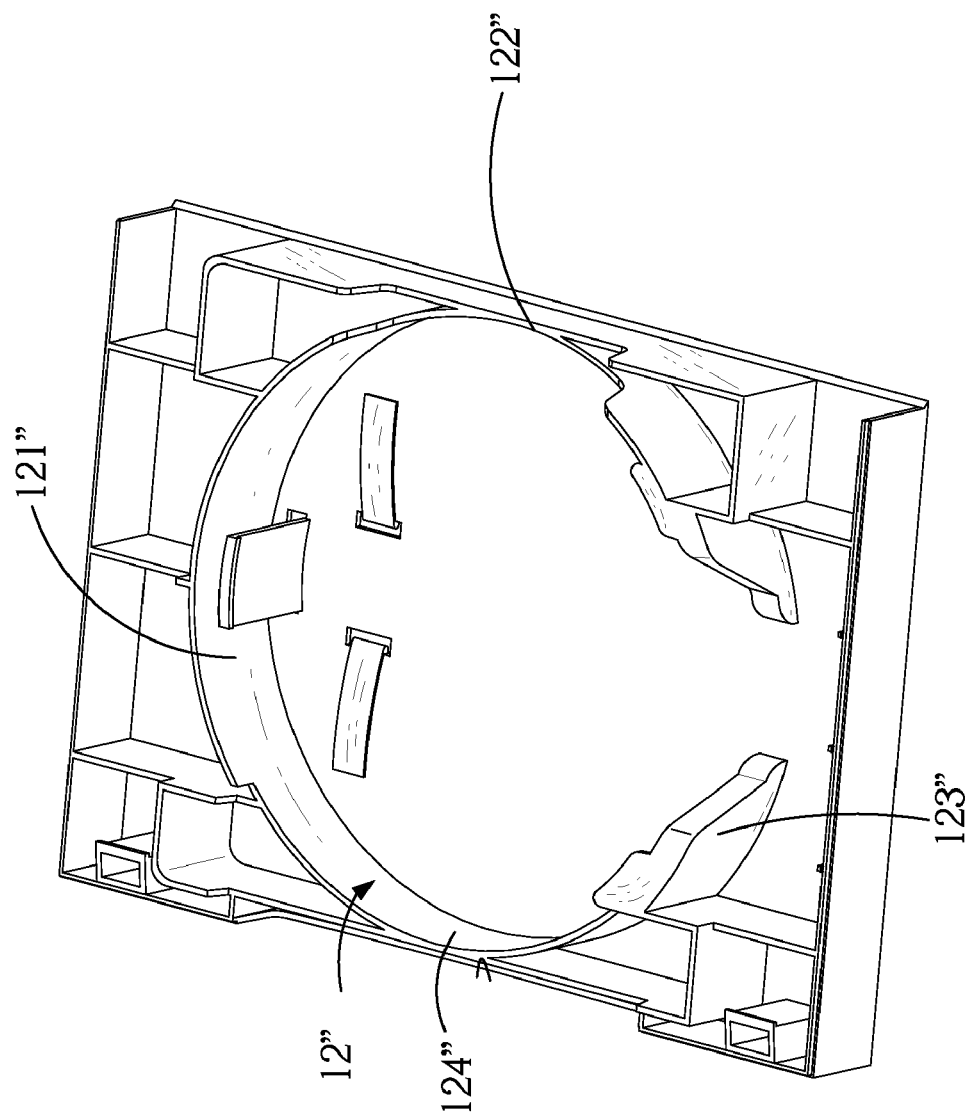
FIG. 6 is a perspective view of a third alternative mode of the storage wall unit of the optical disk storage box according to the above preferred embodiment of the present invention.

As shown in FIG. 6, when the external packing has a cylindrical shape, the storage wall unit 12" has a circular shape correspondingly to define a circular storage cavity 101". That is to say, the first storage wall 121", the second storage wall 122", the third storage wall 123" and the fourth storage wall 124" encircle to form a circle. The other features are the same with the storage wall unit 12.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An optical disk storage box for storing at least an optical disk with an external packing, comprising:
 a storage body comprising:
  a bottom board;
  a storage wall unit perpendicularly provided on said bottom board and defining a storage cavity for storing the optical disk with the external packing, wherein said storage wall unit comprises:
  a first storage wall;
  a second storage wall having a first concaved opening;
  a third storage wall opposite to said first storage wall and having a recess, wherein a height of said recess is equal to that of said third storage wall; and
  a fourth storage wall opposite to said second storage wall;
 at least a fastening member provided within said storage cavity and having a elasticity inherently determined by material rigidity of said fastening member, wherein said fastening member comprises a longitudinal arm upwardly extended from said bottom board, and a transverse arm inwardly extended from an upper end of said longitudinal arm and perpendicular to said first storage wall, wherein a distance between said longitudinal arm and first storage wall is provided; and a pair of blocking projections inwardly extended from two ends of an upper edge of said third storage wall respectively and perpendicular to said third storage wall, said blocking projections connecting with said second storage wall and said fourth storage wall respectively, wherein each of said blocking projections along a direction perpendicular to said third storage wall has a width, said width is smaller than said distance between said longitudinal arm and said first storage wall, in such a manner that when the optical disk is put in or taken out of said storage cavity, a force is applied to said fastening member for driving said fastening member to move close to said first storage wall so that a peripheral edge of the optical disk is enclosed by said longitudinal arm, second storage wall, third storage wall and fourth storage wall, and a top surface of the optical disk is held by said transverse arm and two blocking projections at a holding position to stably hold the optical disk within said storage cavity;

a cover comprising:
a cover board having a cover connecting side; and
three cover walls, perpendicularly extended from three sides of said cover board respectively, wherein said cover connecting side and said three sides define a encircling ring; and a connecting arrangement movably connected with said cover at said cover connecting side, and movably connected with said storage body at a side at which said second storage wall is provided, wherein said connecting arrangement comprises:
a connecting board connecting said storage body with said cover; and
a blocking bar perpendicularly extended from said connecting board for fitting into said first concaved opening, wherein a distance between said blocking bar and an edge of said connecting board connecting with said storage body is equal to a height of said second storage wall, so that when the optical disk storage box is at a closed position, said blocking bar is provided over said first concaved opening for effectively fastening the optical disk with the external packing within said storage cavity.

2. The optical disk storage box for storing at least an optical disk with an external packing, as recited in claim 1, wherein said cover further comprises a pressing bar set, perpendicularly extended from said cover board, comprising a first pressing bar and a second pressing bar provided at positions corresponding to said first storage wall and said third storage wall respectively, in such a manner that when the optical disk storage box is at a closed position, said first pressing bar and said second pressing bar contact with a top surface of said first storage wall and a top surface of said third storage wall respectively for defining a closed room so as to fasten the optical disk within said closed room even if the optical disk is out of said storage cavity accidentally.

3. The optical disk storage box for storing at least an optical disk with an external packing, as recited in claim 2, wherein said cover further comprises a filling bulger, perpendicularly extended from said second pressing bar, which is fittedly and shapedly engaged with said recess of said third storage wall.

4. The optical disk storage box for storing at least an optical disk with an external packing, as recited in claim 3, wherein said storage body further comprises three reinforcing walls, provided at a peripheral edge of said bottom board, perpendicularly extended from said bottom board, and corresponding to said first storage wall, said third storage wall and said fourth storage wall respectively for encircling said storage wall unit so as to slow down impacts or extrusions on said storage body to prevent the optical disk within said storage cavity from being destroyed.

5. The optical disk storage box for storing at least an optical disk with an external packing, as recited in claim 2, wherein said storage body further comprises an elastic member provided on said bottom board within said storage cavity so as to produce an upward force to support the optical disk with the external packing.

6. The optical disk storage box for storing at least an optical disk with an external packing, as recited in claim 2, wherein said cover further comprises a blocking arm inwardly and perpendicularly extended from one of said cover walls corresponding to said fourth storage wall, wherein a distance between said blocking arm and said bottom board is slightly lower than a height of said fourth storage wall at a closed position to stably fasten the optical disk with the external packing within said storage cavity.

7. The optical disk storage box for storing at least an optical disk with an external packing, as recited in claim 1, wherein said storage body further comprises an elastic member provided on said bottom board within said storage cavity so as to produce an upward force to support the optical disk with the external packing.

8. The optical disk storage box for storing at least an optical disk with an external packing, as recited in claim 1, wherein said cover further comprises a blocking arm inwardly and perpendicularly extended from one of said cover walls corresponding to said fourth storage wall, wherein a distance between said blocking arm and said bottom board is slightly lower than a height of said fourth storage wall at a closed position to stably fasten the optical disk with the external packing within said storage cavity.

9. The optical disk storage box for storing at least an optical disk with an external packing, as recited in claim 1, wherein said storage body further comprises three reinforcing walls, provided at a peripheral edge of said bottom board, perpendicularly extended from said bottom board, and corresponding to said first storage wall, said third storage wall and said fourth storage wall respectively for encircling said storage wall unit so as to slow down impacts or extrusions on said storage body to prevent the optical disk within said storage cavity from being destroyed.

10. The optical disk storage box for storing at least an optical disk with an external packing, as recited in claim 9, further comprising a locking arrangement comprising at least a lower locker provided at one of said reinforcing walls, and at least an upper locker provided at one of said cover walls and engaged with said lower locker.

11. The optical disk storage box for storing at least an optical disk with an external packing, as recited in claim 9, wherein said storage body has a lower slot rim provided along a peripheral edge of said reinforcing walls, defining a lower engaging portion, wherein said cover has an upper slot rim provided along a peripheral edge of said cover walls and fitted into said lower slot rim, defining an upper engaging portion, in such a manner that when the optical disk storage box is at a closed position, said lower engaging portion is engaged with said upper engaging portion so that said storage body is effectively engaged with said cover.

12. The optical disk storage box for storing at least an optical disk with an external packing, as recited in claim 1, further comprising a film member detachably attached to an exterior surface of said bottom board, said cover board and said connecting board, wherein said film member is transparent for having a label.

13. An optical disk storage box for storing at least an optical disk with an external packing, comprising:
   a storage body comprising:
      a bottom board;
      a storage wall unit perpendicularly provided on said bottom board and defining a storage cavity for storing the optical disk with the external packing, wherein said storage wall unit comprises:
         a first storage wall;
         a second storage wall having a first concaved opening;
         a third storage wall opposite to said first storage wall and having a recess, wherein a height of said recess is equal to that of said third storage wall; and
         a fourth storage wall opposite to said second storage wall;
      at least a fastening member provided within said storage cavity and having a predetermined elasticity, wherein said fastening member comprises a longitudinal arm upwardly extended from said bottom board, and a transverse arm inwardly extended from an upper end of said longitudinal arm and perpendicular to said first storage wall, wherein a distance between said longitudinal arm and first storage wall is provided; and
      a pair of blocking projections inwardly extended from two ends of an upper edge of said third storage wall respectively and perpendicular to said third storage wall, said blocking projections connecting with said second storage wall and said fourth storage wall respectively, wherein each of said blocking projections along a direction perpendicular to said third storage wall has a width, said width is smaller than said distance between said longitudinal arm and said first storage wall, in such a manner that when the optical disk is put in or taken out of said storage cavity, a force is applied to said fastening member for driving said fastening member to move close to said first storage wall so that a peripheral edge of the optical disk is enclosed by said longitudinal arm, second storage wall, third storage wall and fourth storage wall, and a top surface of the optical disk is held by said transverse arm and two blocking projections at a holding position to stably hold the optical disk within said storage cavity;
   a cover comprising:
      a cover board having a cover connecting side; and
      three cover walls, perpendicularly extended from three sides of said cover board respectively, wherein said cover connecting side and said three sides define a encircling ring; and
      a pressing bar set, perpendicularly extended from said cover board, comprising a first pressing bar and a second pressing bar provided at positions corresponding to said first storage wall and said third storage wall respectively, in such a manner that when the optical disk storage box is at a closed position, said first pressing bar and said second pressing bar contact with a top surface of said first storage wall and a top surface of said third storage wall respectively for defining a closed space so as to fasten the optical disk within said closed space even if the optical disk is out of said storage cavity accidentally; and
   a connecting arrangement movably connected with said cover at said cover connecting side, and movably connected with said storage body at a side at which said second storage wall is provided.

14. The optical disk storage box for storing at least an optical disk with an external packing, as recited in claim 13, wherein said cover further comprises a filling bulger, perpendicularly extended from said second pressing bar, which is fittedly and shapedly engaged with said recess of said third storage wall.

15. The optical disk storage box for storing at least an optical disk with an external packing, as recited in claim 13, wherein said storage body further comprises an elastic member provided on said bottom board within said storage cavity so as to produce an upward force to support the optical disk with the external packing.

16. The optical disk storage box for storing at least an optical disk with an external packing, as recited in claim 13, wherein said cover further comprises a blocking arm inwardly and perpendicularly extended from one of said cover walls corresponding to said fourth storage wall, wherein a distance between said blocking arm and said bottom board is slightly lower than a height of said fourth storage wall at a closed position to stably fasten the optical disk with the external packing within said storage cavity.

17. The optical disk storage box for storing at least an optical disk with an external packing, as recited in claim 13, wherein said storage body further comprises three reinforcing walls, provided at a peripheral edge of said bottom board, perpendicularly extended from said bottom board, and corresponding to said first storage wall, said third storage wall and said fourth storage wall respectively for encircling said storage wall unit so as to slow down impacts or extrusions on said storage body to prevent the optical disk within said storage cavity from being destroyed.

18. The optical disk storage box for storing at least an optical disk with an external packing, as recited in claim 17, further comprising a locking arrangement comprising at least a lower locker provided at one of said reinforcing walls, and at least an upper locker provided at one of said cover walls and engaged with said lower locker.

19. The optical disk storage box for storing at least an optical disk with an external packing, as recited in claim 17, wherein said storage body has a lower slot rim provided along a peripheral edge of said reinforcing walls, defining a lower engaging portion, wherein said cover has an upper slot rim provided along a peripheral edge of said cover walls and fitted into said lower slot rim, defining an upper engaging portion, in such a manner that when the optical disk storage box is at a closed position, said lower engaging portion is engaged with said upper engaging portion so that said storage body is effectively engaged with said cover.

20. The optical disk storage box for storing at least an optical disk with an external packing, as recited in claim 13, further comprising a film member detachably attached to an exterior surface of said bottom board, said cover board and said connecting board, wherein said film member is transparent for having a label.

* * * * *